United States Patent
Lim et al.

(10) Patent No.: US 11,705,938 B1
(45) Date of Patent: Jul. 18, 2023

(54) ETHERNET LINK TRANSMIT POWER AND RATE ADJUSTMENT BASED ON ALIEN CROSSTALK FEEDBACK

(71) Applicant: Marvell Asia Pte, Ltd., Singapore (SG)

(72) Inventors: KongHoei Susanto Lim, San Jose, CA (US); Seid Alireza Razavi Majomard, Belmont, CA (US); David Shen, Saratoga, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 338 days.

(21) Appl. No.: 17/175,298

(22) Filed: Feb. 12, 2021

Related U.S. Application Data

(60) Provisional application No. 62/976,968, filed on Feb. 14, 2020.

(51) Int. Cl.
  *H04B 3/32* (2006.01)
  *H04L 1/00* (2006.01)
  *H04B 3/487* (2015.01)
  *H04B 3/54* (2006.01)

(52) U.S. Cl.
  CPC ........... *H04B 3/32* (2013.01); *H04B 3/487* (2015.01); *H04B 3/54* (2013.01); *H04L 1/0002* (2013.01); *H04L 1/0061* (2013.01)

(58) Field of Classification Search
  CPC .. H04B 3/32; H04B 3/487; H04B 3/54; H04L 1/0002; H04L 1/0061
  See application file for complete search history.

(56) References Cited

U.S. PATENT DOCUMENTS

| | | | |
|---|---|---|---|
| 10,868,580 B1 * | 12/2020 | Razavi Majomard | ... H04B 3/32 |
| 2013/0070823 A1 * | 3/2013 | Malkin | ............ H04L 25/03878 375/220 |

* cited by examiner

*Primary Examiner* — Hoon J Chung

(57) ABSTRACT

A network switch includes a plurality of Ethernet ports having their respective Physical (PHY) Layers interconnected via a common interface local to the network switch. The common interface passes local information among respective PHY layers of the Ethernet ports. One or more receivers receive for a first Ethernet port, over the common interface, information indicative of alien cross talk affecting at least one second Ethernet port of the network switch. A transmission attribute controller adjusts, based on the received information indicative of alien cross talk affecting the at least one second Ethernet port of the network switch, a first data rate and/or a first transmit power level to a second data rate and/or a second transmit power level for transmitting data to a remote network device. A first transmitter transmits data via the first Ethernet port according to the second data rate and/or the second transmit power level.

20 Claims, 9 Drawing Sheets

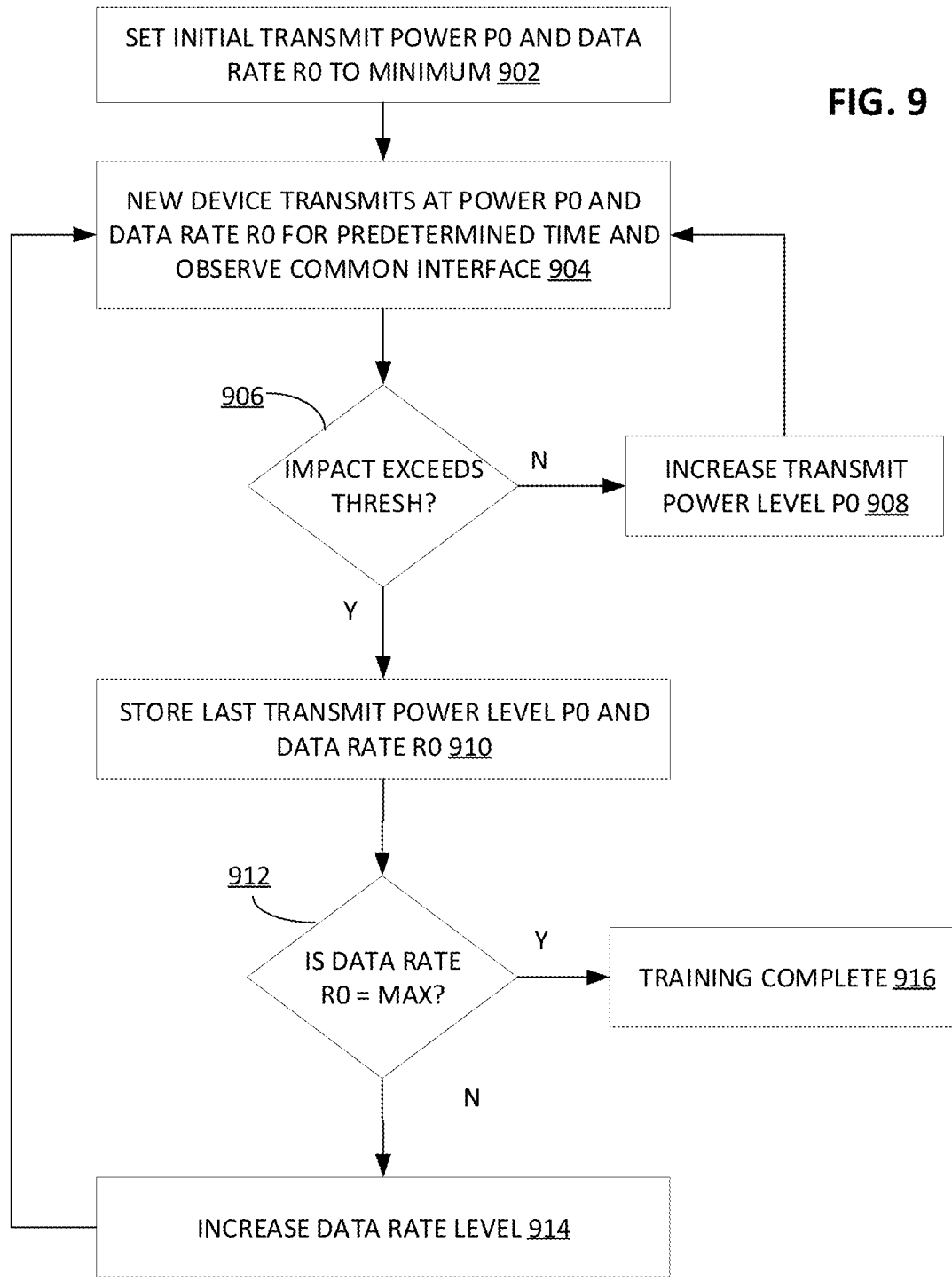

ETHERNET LINK TRANSMIT POWER AND RATE ADJUSTMENT BASED ON ALIEN CROSSTALK FEEDBACK

CROSS REFERENCE TO RELATED APPLICATIONS

This disclosure claims the benefit of copending, commonly-assigned U.S. Provisional Patent Application No. 62/976,968, filed Feb. 14, 2020, which is hereby incorporated by reference herein in its entirety.

FIELD OF USE

This disclosure relates to electronic communications, and more particularly to mitigating interference in signals transmitted over wired communication channels.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Communication systems are widely used in computer and device networks to communicate information between computers and other electronic devices. Transceivers of a communication system send and receive data over a link (including one or more channels) of a communication network to communicate with other transceivers. A transceiver includes a transmitter for sending information across a link, and a receiver for receiving information from a link. The receiver detects transmitted data on the link and converts the data into a form usable by the system connection to the transceiver. For example, one widely-used network communication standard is Ethernet, including several different standards for different network bandwidths, including 10 GBASE-T allowing 10 gigabit/second connections over unshielded or shielded twisted pair cables.

There are multiple sources of impairment and interference in a 10 GBASE-T system which can cause significant performance degradation. These sources of impairment and interference can be broadly categorized as internal and external sources. The internal sources are often caused by the link-partner themselves and imperfect channel characteristics. Example of these sources are inter-symbol interference (ISI), echo, and pair-to-pair crosstalk such as far-end crosstalk (FEXT) and near-end crosstalk (NEXT). Such noise sources are typically known to the link partners and thus can often be canceled effectively with cancelers and equalizers.

Another type of impairment in 10 GBASE-T systems is interferences from sources external to a particular link. Examples of external interfering sources, referred to herein as alien interferers, include adjacent cross-talking Ethernet ports/links, where the noise source is from a different port or cable that is adjacent to the subject link/port. In such circumstances, the source of interference is unknown to the subject link/port, and is a greater challenge to reduce than noise originating from a known source such as ISI, echo, FEXT, or NEXT.

When adding new Ethernet links, conventional standards typically provide for transmit power settings based on received signal power from the other side of the link which is a function of the length of the link. No provisions are generally made for any alien crosstalk effects the new link may have on existing links.

SUMMARY

In a first implementation of the subject matter disclosed here, a network switch includes a plurality of Ethernet ports having their respective Physical (PHY) Layers interconnected via a common interface local to the network switch. The common interface passes local information among respective PHY layers of the Ethernet ports of the network switch, where the Ethernet ports transmit data over wired Ethernet connections to remote network devices. One or more receivers receive for a first Ethernet port, over the common interface, information indicative of alien cross talk affecting at least one second Ethernet port of the network switch. A transmission attribute controller adjusts for the first Ethernet port, based on the received information indicative of alien cross talk affecting the at least one second Ethernet port of the network switch, a first data rate and/or a first transmit power level to a second data rate and/or a second transmit power level for transmitting data to a remote network device. A first transmitter configured to transmit data via the first Ethernet port according to the second data rate and/or the second transmit power level.

In a first instance of the first implementation, the transmission attribute controller, when adjusting the first data rate and/or the first transmit power level to the adjusted second data rate and/or the second transmit power level, establishes a baseline alien crosstalk value based on the information received over the common interface indicative of alien cross talk during a non-data transfer interval, monitors the information received over the common interface during a data transfer interval when the transmitter transmits via the first Ethernet port training data at the first transmit power level and the first data rate to the remote network device, detects feedback indicating alien crosstalk effects to the at least one second Ethernet port of the network switch due to the transmitting, and adjusts the first data rate and/or the first transmit power level to the second data rate and/or the second transmit power level based on the detected feedback.

In a second instance of the first implementation, the common interface includes at least one from a group comprising of a shared memory among the interconnected PHY layers and a System Management (SM) Bus interconnecting the PHY layers.

In a third instance of the first implementation, the feedback comprises at least one from a group comprising (i) an indicator of a failure of the at least one second Ethernet port of the network switch, and (ii) an indicator of a retraining sequence for the at least one second Ethernet port of the network switch.

In a fourth instance of the first implementation, the first power level and the first data rate are initially set to respective maximum power and data rate values.

In the fourth instance of the first implementation, the transmission attribute controller, when adjusting the first data rate and/or the first transmit power level to the second data rate and/or the second transmit power level, compares the feedback to the baseline alien crosstalk value level, and reduces the first rate and/or first transmit power level based on the comparing.

In the fourth instance of the first implementation, the transmission attribute controller, when comparing and reducing, iteratively adjusts the data rate and/or first transmit power level based on iterative comparisons of iteratively obtained feedback to the baseline alien crosstalk value level.

In a fifth instance of the first implementation, the first power level and the first data rate are initially set to respective minimum power and data rate values.

In the fifth instance of the first implementation, the transmission attribute controller, when adjusting the first data rate and/or the first transmit power level to the second data rate and/or the second transmit power level, compares the feedback to the baseline alien crosstalk value level, and increases the first rate and/or first transmit power level based on the comparing.

In the fifth instance of the first implementation, the transmission attribute controller, when comparing and increasing, iteratively adjusts the data rate and/or first transmit power level based on iterative comparisons of iteratively obtained feedback to the baseline alien crosstalk value level.

In a second implementation of the subject matter disclosed here, an Ethernet port includes a receiver, a control state circuitry, and a transmitter. The receiver receives, over a common interface interconnecting the Ethernet port to at least a second Ethernet port via their respective Physical (PHY) Layers, information indicative of alien cross talk affecting the at least second Ethernet port, the common interface being configured to pass local information among respective PHY layers. The control state circuitry adjusts, based on the received information indicative of alien cross talk affecting the at least second Ethernet port, a first data rate and/or a first transmit power level to a second data rate and/or a second transmit power level for transmitting data to a remote network device. The transmitter transmits data according to the second data rate and/or the second transmit power level.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which:

FIG. 9 illustrates a flowchart for a method of establishing a link transmit power setting according to implementations of the subject matter of this disclosure.

DETAILED DESCRIPTION

As noted above, there is a need for systems and methods than minimize any alien crosstalk/interference impact to existing Ethernet links due to expansion of one or more new Ethernet links being added to the network. Accordingly, the present disclosure provides network switches, Ethernet ports, and associated operating methods for minimizing the impact of alien crosstalk on neighboring Ethernet ports. In accordance with one implementation, a method of operating an Ethernet port includes transmitting training data to a link partner at a first data rate and at a first transmit power level. The first data rate and/or first transmit power level is respectively adjusted to a second data rate and/or second transmit power level based on feedback representing alien crosstalk effects to neighboring Ethernet ports caused by the transmitting.

Figure 1:
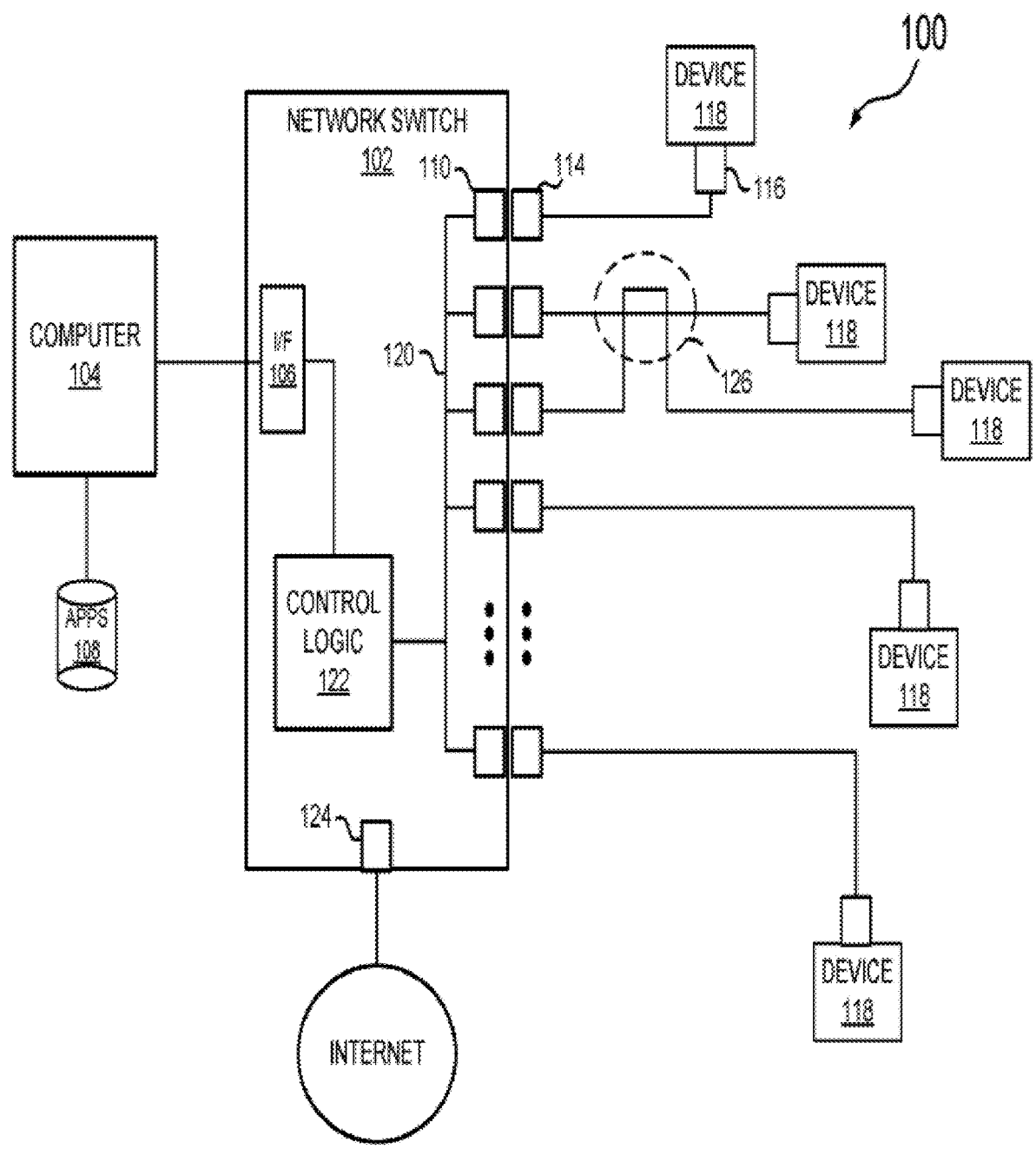
FIG. 1 illustrates an Ethernet network architecture in which implementations of the subject matter of this disclosure may be used.

FIG. 1 illustrates one implementation of a network architecture, generally designated 100. A network device such as a network switch 102 interfaces with a general-purpose computer 104 via an interface circuit 106. The computer can be local to the network, or remote, such that the network switch 102 is controlled by Information Technology (IT) personnel. In one implementation, the computer 104 executes instructions associated with network applications, including diagnostics software that are stored in memory 108. The diagnostics software provides a methodology for the network switch 102 to carry out diagnostic processes involving, for example, crosstalk and transmit power determinations, more fully described below. Although FIG. 1 shows the computer 104 located externally to the network switch 102, in one implementation, the network switch 102 includes a processing circuitry configured to perform the operations of the computer 104 such as carrying out the diagnostic processes involving, for example, crosstalk and transmit power determinations.

As shown in FIG. 1, the network switch 102 includes multiple Ethernet ports 110 corresponding to individual Ethernet links. The network switch 102 can include forty-eight or more Ethernet ports to support an equal number of links. Each Ethernet port connects to a local end 114 of an Ethernet cable. The remote end 116 of each cable connects to a network device 118, such as a computer, network printer, access node or the link. Further details regarding each Ethernet link are described below with respect to FIG. 2.

As further shown in FIG. 1, each Ethernet port 110 on the network switch 102 communicates to every other port via a signal bus 120. Control logic 122 on the network switch 102 couples to the signal bus 120 and manages coordination between the circuits associated with each Ethernet port 110. The network switch 102 can also include an Internet port 124 that provides Internet access to the various Ethernet links.

Figure 2:
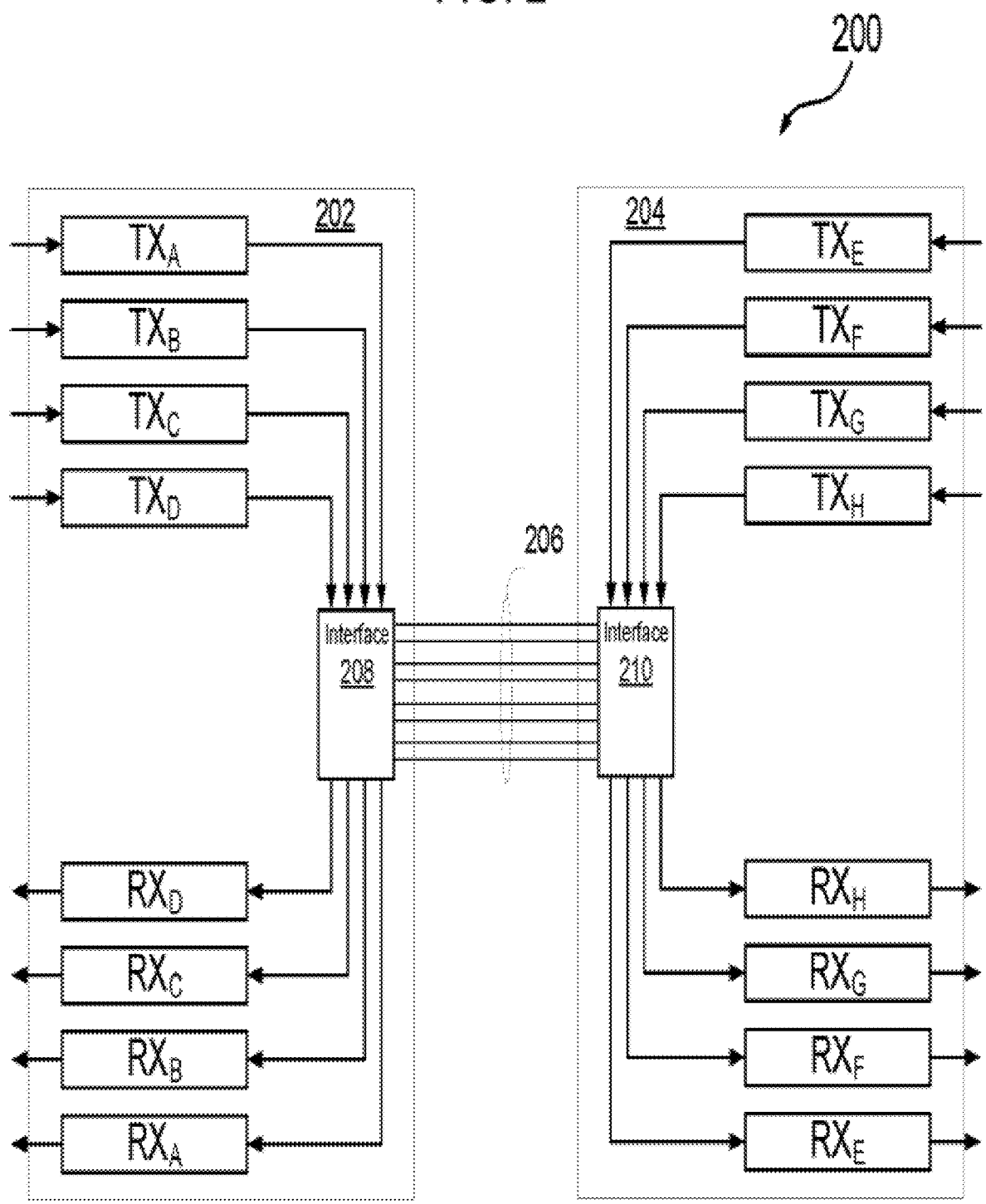
FIG. 2 illustrates an Ethernet link of an implementation of the Ethernet network architecture of FIG. 1.

FIG. 2 is a block diagram illustrating one implementation of an Ethernet port that is employed in the network switch of FIG. 1. The Ethernet port includes a first transceiver integrated circuit (IC) or chip 202 that can communicate with and a second transceiver chip 204. The first transceiver 202 includes "transceiver components" including one or more transmitters $TX_A$-$TX_D$ and one or more receivers $RX_A$-$RX_D$ connected to each other. Similarly, the second transceiver 204 includes various transceiver components including one or more transmitters $TX_E$-$TX_H$ and one or more receivers $RX_E$-$RX_H$ connected to each other. The transmitters and receivers are connected to one or more components (not shown) of a computer system, device, processor, or other "controller" (such as the network switch 102 of FIG. 1) associated with each respective transceiver which wants to communicate data over the communication network. For example, the transmitters $TX_A$-$TX_D$ receive data and control signal from the controller connected to the first transceiver 202 in order to send the data over the network to other transceivers and controllers, while the receivers $RX_A$-$RX_D$ receive data from other transceivers and controllers via the network in order to provide the data to the controller connected to the first transceiver 202.

The first transceiver chip 202 can communicate with the second transceiver chip 204 over one or more communication channels of a communication link 206. In one example, such as one similar to 10 GBASE-T Ethernet standard, four communication channels are provided on the communication link 206, each channel including a twisted pair cable. In that one example, as shown in FIG. 2, there are four transmitters TX and four corresponding receivers RX provided in each of the transceivers 202 and 204, each transmitter associated with one of the local near-end receivers in the same transceiver, and each transmitter/receiver pair dedicated to one channel used for duplex communication. A transmitter/receiver pair in the first transceiver 202 communicates across a channel of the link 206 to a far-end transmitter/receiver pair in the second transceiver 204. A transmitter TX and a receiver RX that are connected to the same channel/link are considered "link partners," as used herein.

An interface 208 is provided in the first transceiver 202 and interface 210 is provided in the second transceiver 204 to allow data transmissions between the transceivers to be routed to the appropriate transceiver blocks. For example, the interfaces 208 and 210 can include transformers, and circuitry used for directing signals or data (alternatively, some or all circuitry can be included in other components, such as transmitters TX and receivers RX).

In one example, from the point of view of the first transceiver chip 202, data transmissions during a normal or regular operation mode from a local transmitter TX are provided to the interface 208, which outputs the data on a corresponding channel of the communication link 206. The data is received by the link partner, the second transceiver chip 204. The interface 210 of the transceiver 204 provides the received data to its receiver RX connected to that same channel. Furthermore, due to noise effects such as near-end crosstalk and echo, the data transmitted by the transmitters is also received by the near-end receivers in the same transceiver. Echo and crosstalk filters are used to filter out this noise so that the receivers receive only data from other transceivers. In virtually all real scenarios, the data transmitted by a local transmitter has no dependence or relation with data being received by the corresponding local receiver.

In many instances, enterprise applications that employ the channel architecture of FIG. 2 utilize thousands of such deployments, resulting in complex crosstalk environments. For instance, in many circumstances such as the network of FIG. 1, a commercial building or residence employs existing Ethernet cable throughout various walls and ceilings in order to establish each link from a given remote location in the building (such as a switch plate in a given office), to the centralized location of the network switch. The original routing of the cables is such that one or more newly added cables causes alien crosstalk interference affecting one or more of the previously installed original cables. This is shown in FIG. 1, at 126.

The Ethernet ports of FIG. 2, which are employed in the network of FIG. 1 operate at very high data rates, as high as 10 Gbps. Ports that are exposed to alien crosstalk are unable to operate at such high data rates and need to have their data rates reduced in order to have an acceptable signal-to-noise ratio (SNR) for data transfers. Such a situation is undesirable when installing new links.

Figure 3A:
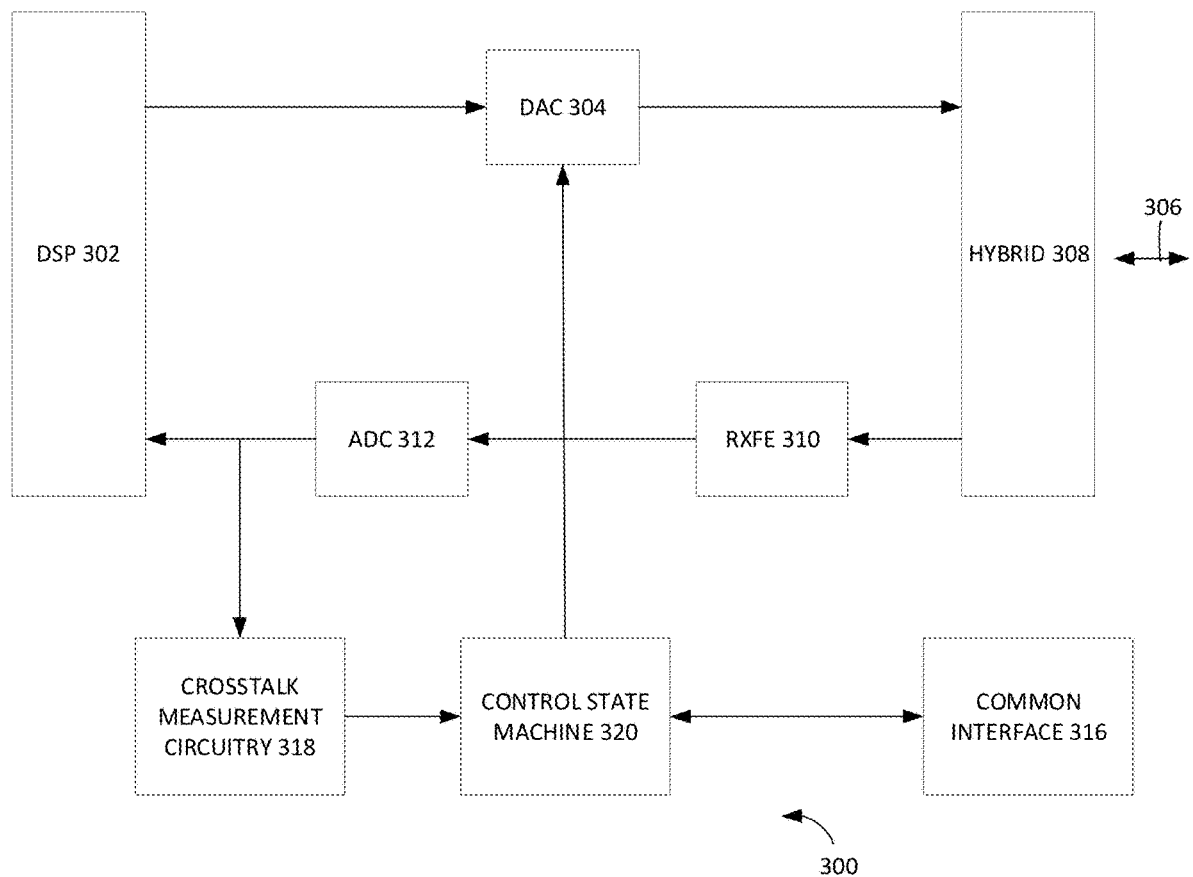
FIG. 3A illustrates a block diagram of an implementation of an Ethernet Physical (PHY) Layer in the Ethernet link of FIG. 2.

FIG. 3A is a block diagram of one implementation of an Ethernet physical circuit (PHY) architecture that minimizes the impact of crosstalk to neighboring Ethernet ports as a new Ethernet port is installed for service in a given network. The PHY architecture, generally designated 300, is employed for each of the transmit/receive channels of each end of the link shown in FIG. 2. The PHY includes a digital signal processor DSP 302 that includes various adaptive filters that are trained during training modes of operation to generate filter coefficients for minimizing near-end and far-end crosstalk, as well as echo effects along the port. In one implementation, the DSP 302 includes an input to receive parameter information relating to other links coupled to the network device or switch (such as switch 102 in FIG. 1). Along a transmit path of the PHY, a digital-to-analog converter (DAC) 304 acts as a transmit driver and generates analog output signals for transmission along a transmission line 306 via hybrid circuitry 308. A receive path of the PHY includes a receiver front end circuit 310 that receives incoming signals via the hybrid circuit 308 and provides the received signals to an analog-to-digital converter (ADC) 312. The digitized signals are then fed to the DSP for filtering, equalization, and so forth.

For situations involving installation of a new Ethernet port into an existing network, one implementation of the PHY architecture employs training logic to generate feedback relating to any effects on other links arising from operation of the new link. A crosstalk measurement circuitry 318 detects crosstalk effects on the new Ethernet port being put into the existing network, and can compare the detected crosstalk to a pre-programmed threshold level or to previously detected levels of crosstalk. Crosstalk information is fed to the crosstalk measurement circuitry 318 from the output of the ADC 312 and/or the DSP 302. The DSP 302 is able to provide crosstalk information in situations where echo from transmission hides alien crosstalk information that might otherwise be available from the ADC 312. Measurements made by the crosstalk measurement circuitry 318 is fed to a control state machine 320 (i.e., a transmission attribute controller). The control state machine 320 is also fed crosstalk measurement relating to neighboring Ethernet PHYs over a common interface 316. As will be explained below in connection with FIGS. 3B and 3C, a plurality of Ethernet ports has their respective PHY Layers interconnected via a common interface 316 local to the network switch 102. The common interface is configured to pass local information among respective PHY layers of the Ethernet ports of the network switch 102. In an implementation, the local information includes a respective alien crosstalk measurement value observed at the respective PHY Layers of each of the plurality of Ethernet ports. As explained in further detail below, the control state machine 320 provides transmit power adjustments and/or data rate adjustments to the transmit DAC 304 based on the detected feedback received from common interface 316, thus optimizing any adverse effects to existing links from the newly installed link.

Figure 3B:
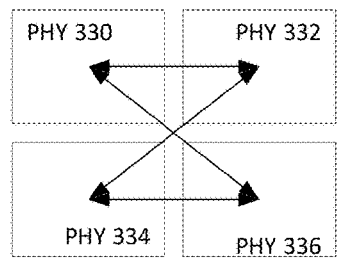
FIG. 3B is a block diagram of one implementation of a common interface 316 of FIG. 3A.

FIG. 3B is a block diagram of one implementation of a common interface 316 of FIG. 3A. In the implementation shown in FIG. 3B, the common interface 316 is a signal bus, such as signal bus 120 shown in FIG. 1. As illustrated in FIG. 3B, a plurality of Ethernet ports 330, 332, 334, and 336 on the network switch 102 each communicate with the other Ethernet ports via the signal bus 120. In particular, each Ethernet port 330, 332, 334, and 336, via its respective crosstalk measurement circuitry 318 measures an amount of alien crosstalk observed during transmission by a new Ethernet port being added to the plurality of Ethernet ports. This alien crosstalk measurement is shared among the other Ethernet ports via the signal bus 120 (i.e., the common interface). Although FIG. 2 shows the signal bus 120 as being part of network switch 102, such a configuration is not required. In one implementation, a single silicon chip includes up to eight PHY devices. In such an implementation, the PHYs inside of the silicon chip are interconnected by their own common bus that can be connected to a common interface, such as signal bus 120. Accordingly, a new Ethernet port being added to an existing group of Ethernet ports can observe alien crosstalk effects on the neighboring Ethernet ports during transmission by receiving local information via the signal bus 120. This information is fed to the control state machine 320 which provides transmit power adjustments and/or data rate adjustments to the transmit DAC 304 based on the detected feedback received from the signal bus 120.

Figure 3C:
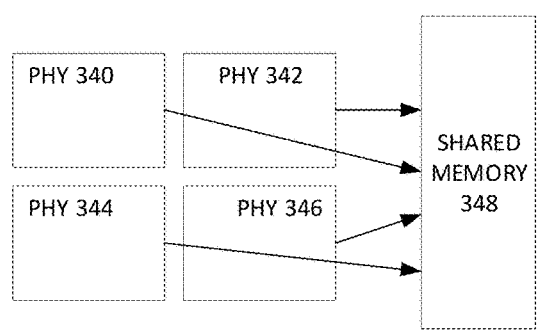
FIG. 3C is a block diagram of another implementation of a common interface 316 of FIG. 3A.

FIG. 3C is a block diagram of another implementation of a common interface 316 of FIG. 3A. In the implementation shown in FIG. 3c, the common interface 316 is a shared memory 348. As illustrated in FIG. 3C, a plurality of Ethernet ports 340, 342, 344, and 346 on the network switch 102 each share information with each other via the shared memory 348. In particular, each Ethernet port 330, 332, 334, and 336, via its respective crosstalk measurement circuitry 318 measures an amount of alien crosstalk observed during transmission by a new Ethernet port being added to the plurality of Ethernet ports. This alien crosstalk measurement is shared among the other Ethernet ports via the shared memory 348 (i.e., the common interface). Accordingly, a new Ethernet port being added to an existing group of Ethernet ports can observe alien crosstalk effects on the neighboring Ethernet ports during transmission by receiving alien crosstalk information from the shared memory 348. This alien crosstalk information is fed to the control state machine 320 which provides transmit power adjustments and/or data rate adjustments to the transmit DAC 304 based on the detected feedback received from the shared memory 348.

Figure 4:
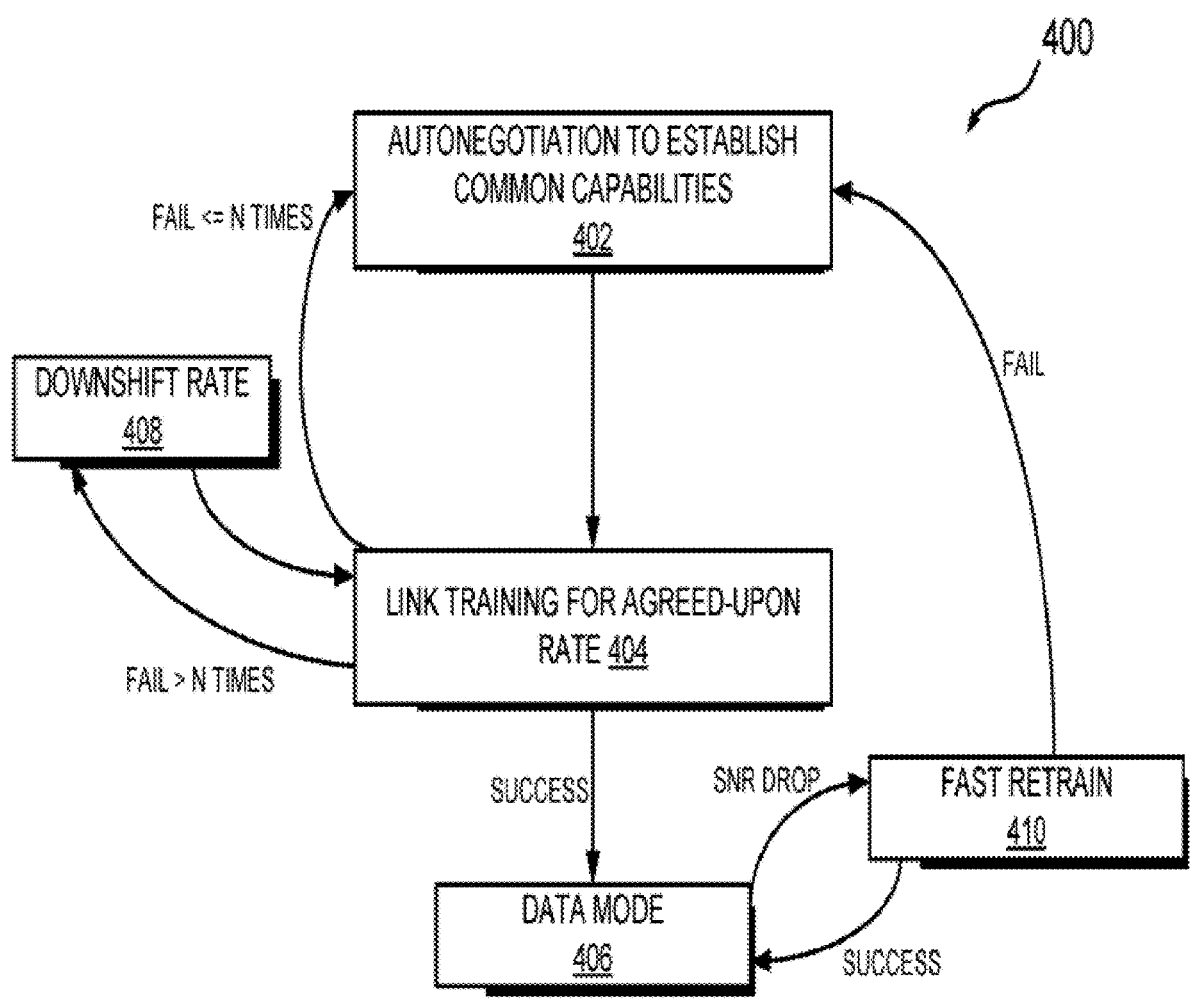
FIG. 4 illustrates a state diagram for one implementation of operating an Ethernet link according to the subject matter of this disclosure.

FIG. 4 is a state diagram illustrating one example of operating an Ethernet port, generally designated 400. This example is suitable for 10 GBASE-T Ethernet standard, but other different configurations and types of transceiver components can be used in other implementations for other, different communication standards. Bringing up a given port generally begins with an auto-negotiation step, at 402, where the link partners communicate with each other using a low-speed and low data rate protocol to advertise common capabilities. Such capabilities might involve rate downshifting and a commonly agreed-upon starting data rate. Following auto-negotiation, the link begins a training step, at 404, to transfer data between the link partners at the agreed-upon transmit power level and data rate to generate a certain level of filter adaptations. If the training mode is successful, then the link enters a normal data mode of operation, shown at 406.

With continued reference to FIG. 4, should the link training mode fail less than a predetermined threshold number of times N, then the auto-negotiation step is restarted, at 402, followed by another link training step, at 404. If the link continues to fail more than the threshold allowed, then the data rate is reduced, at 408, and the link returned to the auto-negotiation mode 402 again. The threshold level N is programmable and based on the time allowed for auto-negotiation operations, training operations, and so forth.

In the event the link passes training, operates successfully for a given period of time, then fails for some unknown reason, then a fast retrain takes place, at 410, to restore the link to the normal data operating mode. A fast retrain generally involves far fewer training steps to return the link to normal operation as compared to a full training sequence. In some implementations, the fast retrain is associated with a quiet period or other signature that is detectable by other PHY's in the network. In some circumstances, a fast retrain does not work to restore the link to a data operating mode. If this occurs, the link returns to the auto-negotiation mode 402 to re-initialize itself.

The general operating mode steps described above are carried out at any time by any of the Ethernet ports operating in the network. Further, whether a given Ethernet port is undergoing training or a fast retrain is detectable by any other PHY, and/or the network switch due to information received from the common interface 316 (which collects local information such as the unique signatures associated with full training sequences and fast retrain sequences from neighboring links). For example, the information about fast retrain will be shared through the common interface 316 by the neighboring ports that experience the fast retrain.

Figure 5:
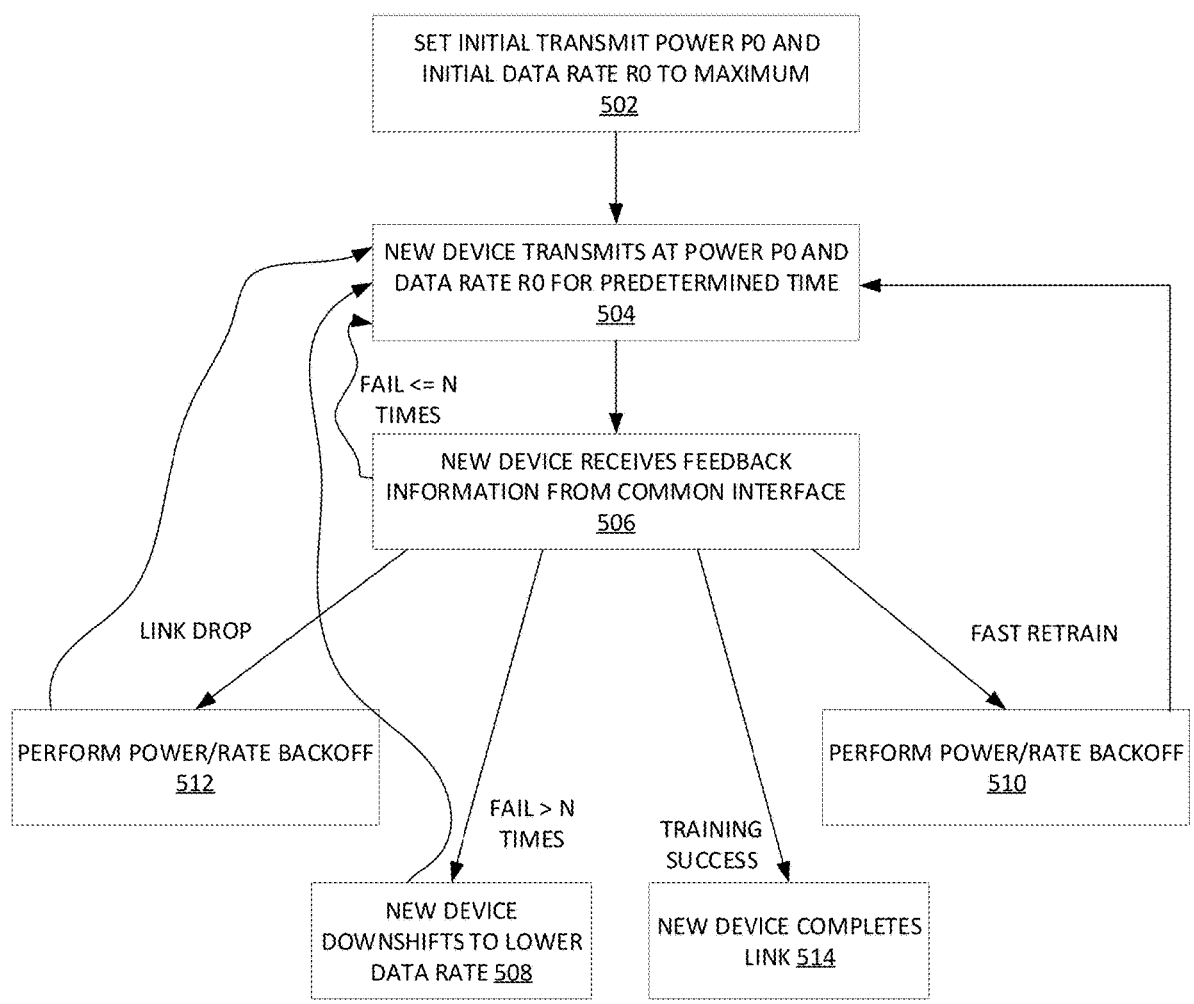
FIG. 5 illustrates a state diagram for a method of establishing a link transmit power setting according to implementations of the subject matter of this disclosure.

Referring now to FIG. 5, one implementation of a transmit power method based on alien link parameters involves generating transmit power and/or data rate adjustments for a new Ethernet port based on feedback from the common interface 316. Different implementations are described below that approach the training of a new Ethernet port in different ways.

Further referring to FIG. 5, a first implementation of the transmit power method takes place during the previously described training mode of operation. With a given PHY in the training mode, the Ethernet port is initially set to transmit training data at a maximum date rate R0 and a maximum transmit power level P0, at 502. The PHY then transmits training data at the transmit power level of P0 (initially set to maximum) and at the data rate R0 (initially set to maximum), at 504. Following the training data transmission, the PHY receives information via the common interface 316 again for any changes in the baseline alien crosstalk for a predetermined time, at 506. If there is a basic training failure associated with the new link less than a predetermined threshold number of times N, then the process reverts back to the initial training step at 504. If the basic training failures occur more than the predetermined threshold number of times N, then the control state machine 320 directs the new PHY and the link partner to operate at a lower data rate, at 508.

At this point, assuming no training failure, and further referring to FIG. 5, the control state machine 320 (FIG. 3) in the PHY may or may not detect changes in crosstalk (based on information received over the common interface 316) affecting the neighboring Ethernet ports. The control state machine 320 then makes one or more of the following adjustments based on any received crosstalk information. For example, the control state machine 320 receives, via information available on the common interface 316, an indication that one or more neighboring Ethernet ports are carrying out a fast retrain. The control state machine 320 then dials-down the transmit power to a level incrementally lower than the previous level, at 510, and the process reverts back to the initial training step, at 504. In a similar manner, control state machine 320 receives, via information available on the common interface 316, an indication that an existing link has completely dropped. In such a circumstance, the control state machine 320 directs the transmit DAC circuitry to operate at a lower transmit power, at 512, and the new link training starts again at the training step 504. In one implementation where neighboring Ethernet links continue to suffer from alien crosstalk effects despite the new Ethernet port being added to the network switch operating a minimum power (due to power back-off operations being performed at blocks 510 and 512), the control state machine 320 directs the transmit DAC circuitry to operate at a lower data rate R0 and a maximum transmit power P0, and new link training starts again at the training step 504. At some point, the new Ethernet port completes training of the link, at 514, with an optimized data rate and transmit power level that is not only optimal for the newly installed link, but has little to no effects on the surrounding links, thereby reducing the risk that the other links downshift to lower data rates and stay there. Although FIG. 5 defines link drop and a fast retrain as the alien crosstalk effects impacting the neighboring Ethernet ports, in various implementation, the common interface 316 also receives information about a drop in signal-to-noise ratio (SNR) and/or an increase in error rate observed at the neighboring Ethernet ports. This information received at the common interface 316 is then fed to the control state machine 320 of the new Ethernet port in training mode and relied upon when determining the optimized data rate and transmit power level for the newly installed link.

Figure 6:
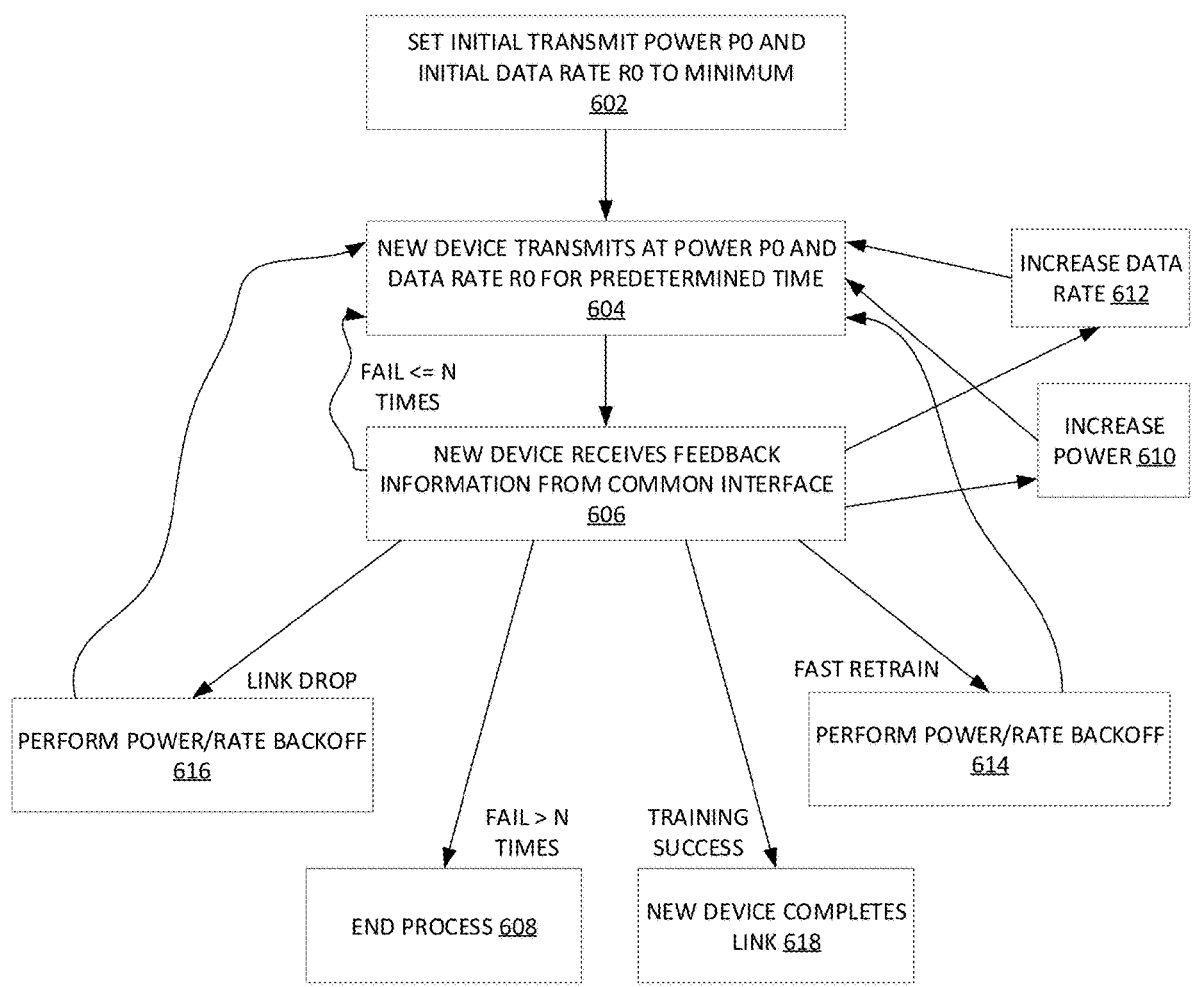
FIG. 6 illustrates a state diagram for another method of establishing a link transmit power setting according to implementations of the subject matter of this disclosure.

FIG. 6 illustrates a state diagram similar to the one shown in FIG. 5, corresponding to a method of setting a transmit power level and data rate, but where the initial data rate and transmit power level are at a minimum level. With a given PHY in the training mode, the Ethernet port is initially set to transmit training data at a minimum date rate R0 and a minimum transmit power level P0, at 602. The PHY then transmits training data at the transmit power level of P0 (initially set to minimum) and at data rate of R0 (initially set to minimum), at 604. Following the training data transmission, the PHY receives information via the common interface 316 again to identify any changes in the baseline alien crosstalk for a predetermined time, at 606. If there is a basic training failure associated with the new Ethernet port that occurs less than a predetermined number of time N, then the process reverts back to the initial training step at 604. If the basic training failures occur more than "N" time, then the training process is terminated, at 608.

Further referring to FIG. 6, should the initial training steps succeed, then the initial power level P0 and/or data rate R0 are increased, at 610 and 612, and the alien crosstalk detection steps repeated, at 604-606. These steps iterate several times until either the training steps fail for the port in training, or a change in cross talk is detected in any of the neighboring links. For example, the control state machine 320 is notified, using information available via the common interface 316, that one or more of the existing links are carrying out a fast retrain. The control state machine 320 then dials-down the transmit power to a level incrementally lower than the previous level, at 614, and the process reverts back to the initial training step, at 604. In a similar manner, the control state machine 320 is notified, using information available over the common interface 316, that an existing link has completely dropped. In such a circumstance, the control state machine 320 directs the transmit DAC circuitry 304 to operate at a lower transmit power, at 616, and the new link training starts again at the training step 604. Similar to FIG. 5, in an implementation where neighboring Ethernet links continue to suffer from alien crosstalk effects despite the new Ethernet port being added to the network switch operating a minimum power (due to power back-off operations being performed at blocks 614 and 616), the control state machine 320 directs the transmit DAC circuitry to operate at a lower data rate R0 and a maximum transmit power P0, and new link training starts again at the training step 604

With continued reference to FIG. 6, at some point, the iterative steps described above lead to a state where training succeeds at a highest power and data rate without a power or rate back-off. At that state, the new port exits the training mode of operation and enter the normal data mode of operation, at 618. Although FIG. 6 also defines link drop and a fast retrain as the alien crosstalk effects impacting the neighboring Ethernet ports, in various implementation, the common interface 316 also receives information about a drop in signal-to-noise ratio (SNR) and/or an increase in error rate observed at the neighboring Ethernet ports. This information received at the common interface 316 is then fed to the control state machine 320 of the new Ethernet port in training mode and relied upon when determining the optimized data rate and transmit power level for the newly installed link.

The implementations of FIG. 5 and FIG. 6 thus provide a mechanism for an Ethernet PHY to receive feedback associated with alien crosstalk on adjacent links caused by operation of a new Ethernet port via a common interface. While FIG. 5 discusses beginning the training steps at 502 at a maximum transmit power level and a maximum data rate level and FIG. 6 discusses beginning the training steps at 602 at a minimum transmit power level and a minimum data rate level, in other implementations, the training steps can begin at an intermediate transmit power level and an intermediate data rate level.

Figure 7:
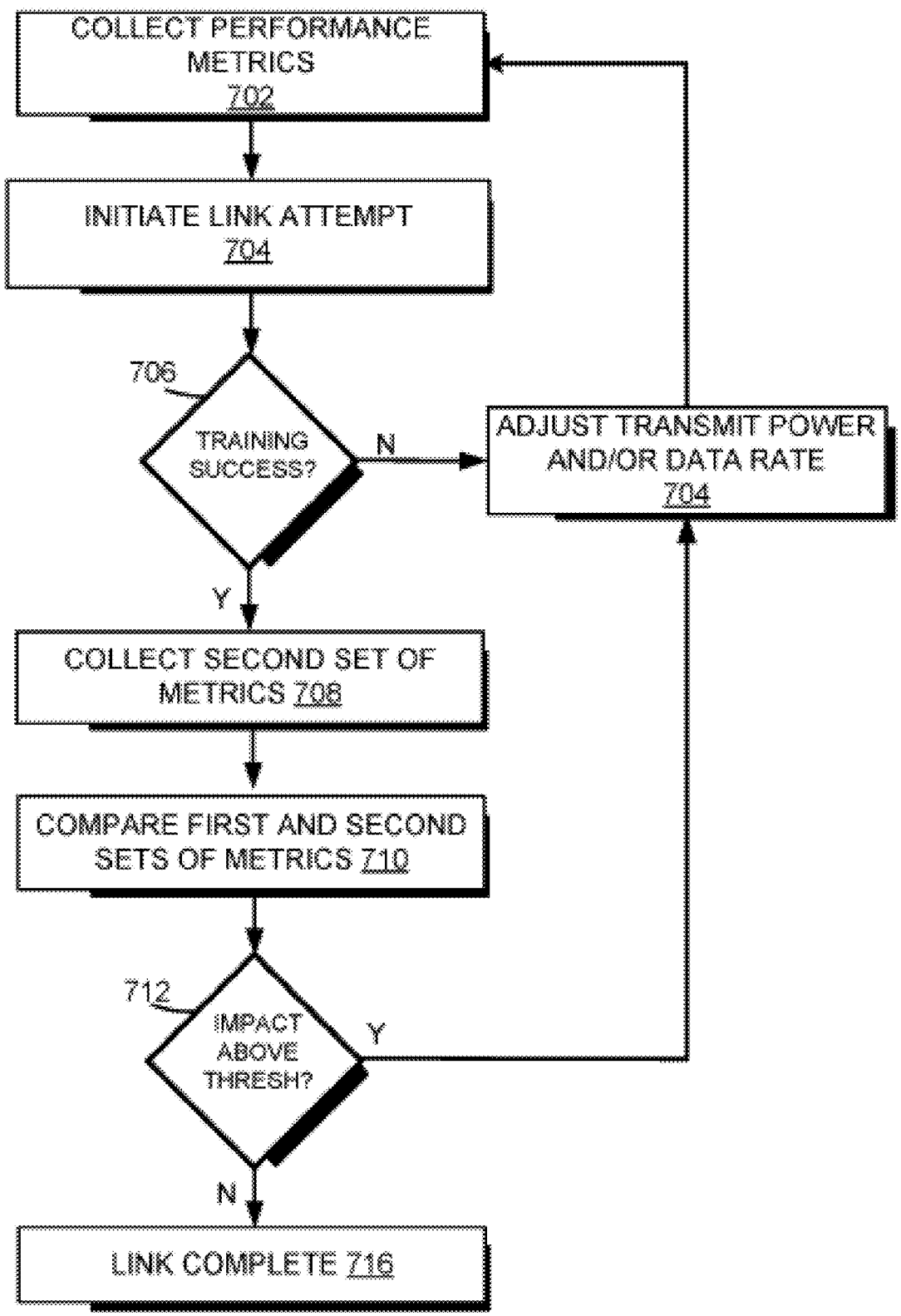
FIG. 7 illustrates a flowchart for a method of establishing a link transmit power setting according to implementations of the subject matter of this disclosure.

Referring now to FIG. 7, one implementation of a Ethernet port testing method utilizing feedback from a common interface involves first collecting a first set of various performance metrics of known neighboring channels, at 702. This is straightforwardly carried out where adjacent links each share information locally in a shared memory (such as shared memory 348 of FIG. 3A) or over a signal bus, such as signal bus 120 of FIG. 1. The performance metrics includes baseline values of packet errors, average LDPC values, LDPC iteration counts, LDPC/CRC errors, SNR margins, power back-off levels, and so forth. At 704, a link attempt is initiated at a highest target line rate for the new link. If the training is successful, at 706, then a second set of the performance metrics is collected, at 708, and compared to the first set of performance metrics, at 710. The method is completed, at 716, if the training for the new link is successful (at 706), and any impacts to neighboring links are less than a predetermined threshold, at 712. If the training is not successful (at 706), or the impacts to other links are above the threshold (at 712), then the process repeats, albeit with the Ethernet PHY adjusted to transmit data at a lower data rate and/or transmit power level, at 714.

Figure 8:
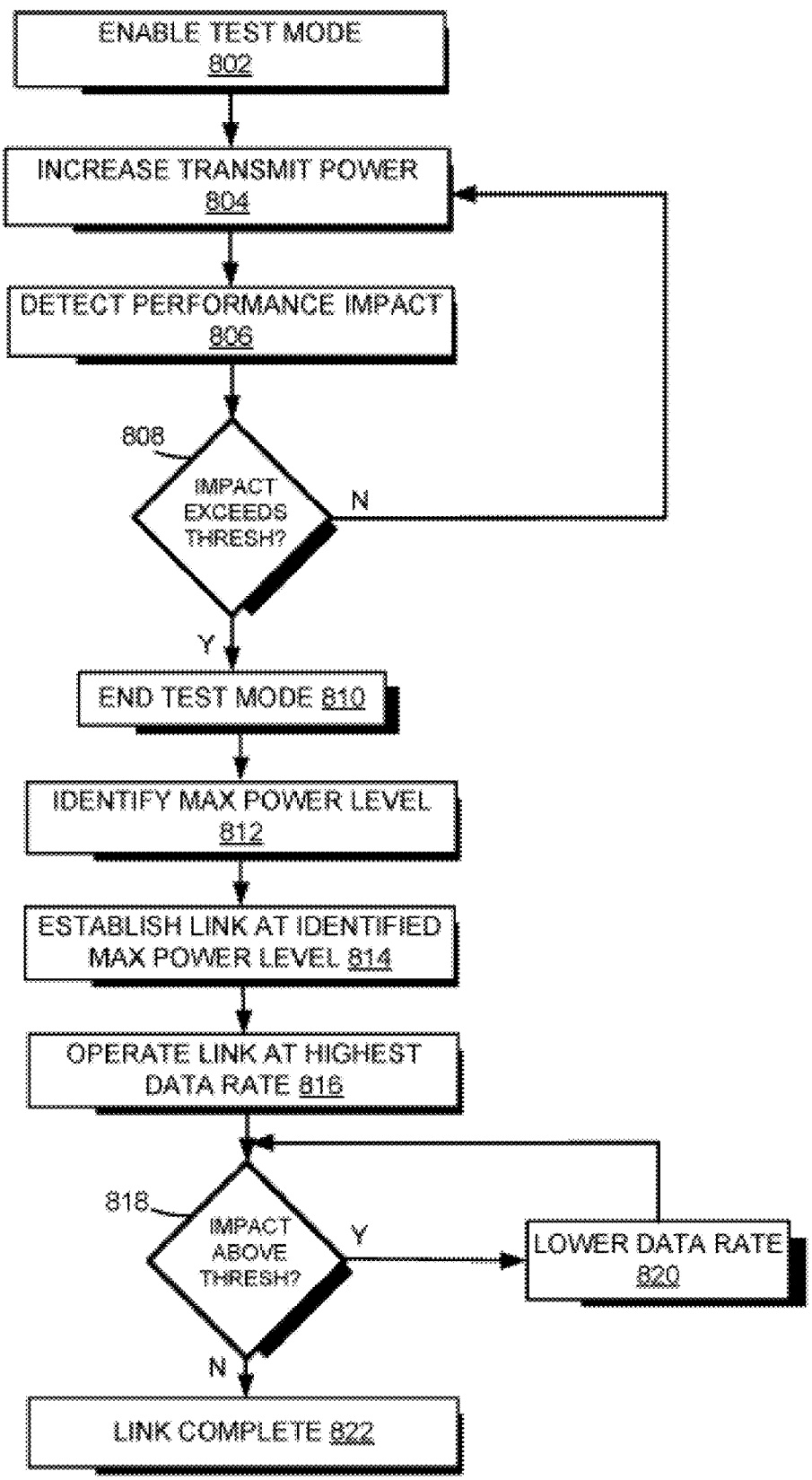
FIG. 8 illustrates a flowchart for a method of establishing a link transmit power setting according to implementations of the subject matter of this disclosure.

FIG. 8 illustrates a further implementation of a link test method similar to FIG. 7 but also includes steps to avoid any performance impact to existing active channels in the network. In the network switch, the performance metrics of known neighboring links are monitored by the control state machine 320 via a common interface 316. During the initialization of a new link, the control state machine 320 enables a test mode for the new link, at 802. The test mode involves gradually increasing the transmit power level of the new PHY, at 804. The test mode ends, at 810, when a detected performance impact, at 806, is determined to meet or exceed a pre-determined threshold. A maximum power level is then identified for the new link, at 812. The link is then established using the determined maximum transmit power level, at 814. For one implementation, a highest data rate is utilized for the newly initiated link, at 816. If the link fails, at 818, then a lower data rate is utilized, at 820. If the link is successful, at 818, then the link training is complete, at 822.

FIG. 9 illustrates a flowchart of a transmit power and data rate training method according to a further implementation that is similar to those described with respect to FIGS. 7 and 8. The method is employed, for example, when determining a highest transmit power possible for various data rates. The method begins with setting the initial data rate R0 and transmit power P0 at a minimum level for the new Ethernet link to be added to the network, at 902. The newly added PHY then utilizes a protocol to enable the test mode and monitor channel conditions of adjacent ports through a shared common interface such as an MDC/MDIO bus, I2C bus, or a shared memory. The control state machine 320 directs the transmit DAC to transmit training data at transmit power P0 and data rate R0 and monitors the performance metrics of neighboring channels sharing the same cable bundle via the common interface, at 904. The metrics involves packet errors, SNR margin, LDPC iteration/average/errors, link drop, fast retrain, and/or power back-off through access to the common interface. If the control state machine determines, at 906, using information available from the common interface, that none of the neighboring Ethernet links are impacted beyond a predetermined threshold, the test mode causes the new link PHY to increase the transmit power level P0 for training data at a specific time interval, at 908. The power level adjustment iteratively continues until an impact to neighboring channels is detected, at 906. If an impact to neighboring channels above a threshold is detected, then to the last transmit power level P0 and the data rate level R0 are stored at the PHY, at 910. The PHY then determines whether the data rate level R0 has reached a maximum value, 912. If, at 912, the PHY determines that the data rate level R0 has reached a maximum value, the PHY then incrementally increases the data rate with the lowest transmit power setting, at 914. Steps 904-914 are iteratively performed until the PHY has stored information relating to a plurality of data rate level R0 and a respective maximum possible transmit power level P0 corresponding to each of the plurality of data rate levels R0. Once the PHY determines that the data rate level R0 has reached a maximum value, at 912, the PHY terminates the training process, at 916. In this manner, the PHY is able to determine a maximum transmit power level P0 corresponding to each of a plurality of data rate levels R0, where each of the combination of transmit power levels P0 and data rate levels R0 do not impact the neighboring Ethernet ports (i.e., no alien crosstalk observed at the neighboring Ethernet ports due to the newly added Ethernet port).

Thus it is seen that a method and circuitry for adjusting a transmit power level and/or a data rate of a new Ethernet link, which mitigates interference in signals transmitted over wired communication channels in adjacent Ethernet links, has been provided.

As used herein and in the claims which follow, the construction "one of A and B" shall mean "A or B."

It is noted that the foregoing is only illustrative of the principles of the invention, and that the invention can be practiced by other than the described implementations, which are presented for purposes of illustration and not of limitation, and the present invention is limited only by the claims which follow.

What is claimed is:

1. A network switch comprising:
   a plurality of Ethernet ports having their respective Physical (PHY) Layers interconnected via a common interface local to the network switch, the common interface being configured to pass local information among respective PHY layers of the Ethernet ports of the network switch, the Ethernet ports being configured to transmit data over wired Ethernet connections to remote network devices;
   one or more receivers configured to receive for a first Ethernet port, over the common interface, information indicative of alien cross talk affecting at least one second Ethernet port of the network switch;
   a transmission attribute controller configured to adjust for the first Ethernet port, based on the received information indicative of alien cross talk affecting the at least one second Ethernet port of the network switch, a first data rate and/or a first transmit power level to a second data rate and/or a second transmit power level for transmitting data to a remote network device; and
   a first transmitter configured to transmit data via the first Ethernet port according to the second data rate and/or the second transmit power level.

2. The network switch of claim 1, wherein the transmission attribute controller, when adjusting the first data rate and/or the first transmit power level to the second data rate and/or the second transmit power level, is configured to:
   establish a baseline alien crosstalk value based on the information received over the common interface indicative of alien cross talk during a non-data transfer interval;
   monitor the information received over the common interface during a data transfer interval when the transmitter transmits via the first Ethernet port training data at the first transmit power level and the first data rate to the remote network device;
   detect feedback indicating alien crosstalk effects to the at least one second Ethernet port of the network switch due to the transmitting; and
   adjust the first data rate and/or the first transmit power level to the second data rate and/or the second transmit power level based on the detected feedback.

3. The network switch of claim 2, wherein the feedback comprises at least one from a group comprising (i) an indicator of a failure of the at least one second Ethernet port of the network switch, and (ii) an indicator of a retraining sequence for the at least one second Ethernet port of the network switch.

4. The network switch of claim 2, wherein the first power level and the first data rate are initially set to respective maximum power and data rate values.

5. The network switch of claim 4, wherein the transmission attribute controller, when adjusting the first data rate and/or the first transmit power level to the second data rate and/or the second transmit power level, is configured to:
- compare the feedback to the baseline alien crosstalk value level; and
- reduce the first rate and/or first transmit power level based on the comparing.

6. The network switch of claim 5, wherein the transmission attribute controller, when comparing and reducing, is further configured to:
- iteratively adjust the data rate and/or first transmit power level based on iterative comparisons of iteratively obtained feedback to the baseline alien crosstalk value level.

7. The network switch of claim 2, wherein the first power level and the first data rate are initially set to respective minimum power and data rate values.

8. The network switch of claim 7, wherein the transmission attribute controller, when adjusting the first data rate and/or the first transmit power level to the second data rate and/or the second transmit power level, is configured to:
- compare the feedback to the baseline alien crosstalk value level; and
- increase the first rate and/or first transmit power level based on the comparing.

9. The network switch of claim 8, wherein the transmission attribute controller, when comparing and increasing, is further configured to:
- iteratively adjust the data rate and/or first transmit power level based on iterative comparisons of iteratively obtained feedback to the baseline alien crosstalk value level.

10. The network switch of claim 1, wherein the common interface comprises at least one from a group comprising of a shared memory among the interconnected PHY layers and a System Management (SM) Bus interconnecting the PHY layers.

11. An Ethernet port comprising:
- a receiver configured to, over a common interface interconnecting the Ethernet port to at least a second Ethernet port via their respective Physical (PHY) Layers, receive information indicative of alien cross talk affecting the at least second Ethernet port, the common interface being configured to pass local information among respective PHY layers;
- a control state circuitry configured to adjust, based on the received information indicative of alien cross talk affecting the at least second Ethernet port, a first data rate and/or a first transmit power level to a second data rate and/or a second transmit power level for transmitting data to a remote network device; and
- a transmitter configured to transmit data according to the second data rate and/or the second transmit power level.

12. The Ethernet port of claim 11, wherein the control state circuitry, when adjusting the first data rate and/or the first transmit power level to the second data rate and/or the second transmit power level, is configured to:
- establish a baseline alien crosstalk value based on the information received over the common interface indicative of alien cross talk during a non-data transfer interval;
- monitor the information received over the common interface during a data transfer interval when the transmitter transmits training data at the first transmit power level and the first data rate to the remote network device;
- detect feedback indicating alien crosstalk effects to the at least one second Ethernet port due to the transmitting; and
- adjust the first data rate and/or the first transmit power level to the second data rate and/or the second transmit power level based on the detected feedback.

13. The Ethernet port of claim 12, wherein the feedback comprises at least one from a group comprising an indicator of a failure of the at least one second Ethernet port of the network switch and an indicator of a retraining sequence for the at least one second Ethernet port of the network switch.

14. The Ethernet port of claim 12, wherein the first power level and the first data rate are initially set to respective maximum power and data rate values.

15. The Ethernet port of claim 14, wherein the control state circuitry, when adjusting the first data rate and/or the first transmit power level to the second data rate and/or the second transmit power level, is configured to:
- compare the feedback to the baseline alien crosstalk value level; and
- reduce the first rate and/or first transmit power level based on the comparing.

16. The Ethernet port of claim 15, wherein the control state circuitry, when comparing and reducing, is further configured to:
- iteratively adjust the data rate and/or first transmit power level based on iterative comparisons of iteratively obtained feedback to the baseline alien crosstalk value level.

17. The Ethernet port of claim 12, wherein the first power level and the first data rate are initially set to respective minimum power and data rate values.

18. The Ethernet port of claim 17, wherein the control state circuitry, when adjusting the first data rate and/or the first transmit power level to the second data rate and/or the second transmit power level, is configured to:
- compare the feedback to the baseline alien crosstalk value level; and
- increase the first rate and/or first transmit power level based on the comparing.

19. The Ethernet port of claim 18, wherein the control state circuitry, when comparing and increasing, is further configured to:
- iteratively adjust the data rate and/or first transmit power level based on iterative comparisons of iteratively obtained feedback to the baseline alien crosstalk value level.

20. The Ethernet port of claim 11, wherein the common interface comprises at least one from a group comprising of a shared memory among the interconnected PHY layers and a System Management (SM) Bus interconnecting the PHY layers.

* * * * *